Jan. 4, 1955
G. T. REYNOLDS ET AL
2,698,906
SCINTILLATION COUNTER
Filed Dec. 7, 1950
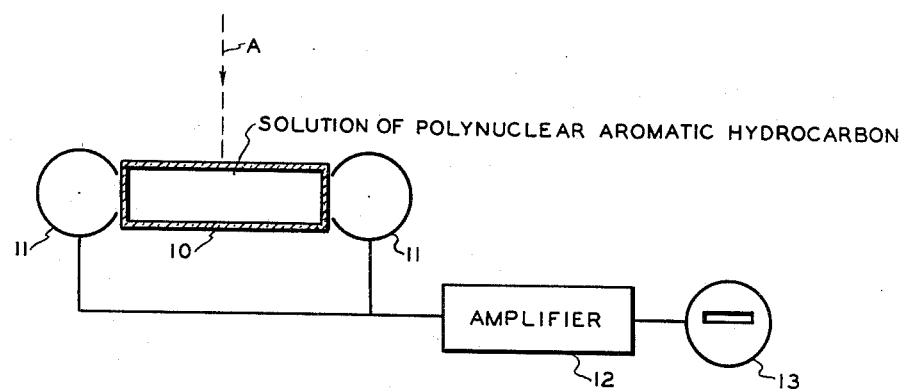
INVENTORS
GEORGE T. REYNOLDS,
GIORGIO SALVINI &
FRANCIS B. HARRISON
BY *Stowell & Evans*
ATTORNEYS

United States Patent Office 2,698,906
Patented Jan. 4, 1955

2,698,906

SCINTILLATION COUNTER

George T. Reynolds, Giorgio Salvini, and Francis B. Harrison, Princeton, N. J., assignors to Research Corporation, New York, N. Y., a corporation of New York Application December 7, 1950, Serial No. 199,656

8 Claims. (Cl. 250—71)

This invention relates to apparatus for the detection of ionizing radiation and particularly to scintillation counters employing a polynuclear aromatic hydrocarbon scintillation medium.

Apparatus for the detection of ionizing radiation using solid crystals of hydrocarbons such as napthalene have been proposed but have certain disadvantages because of the difficulty of making clear crystals of large size. It is difficult to make clear crystals of organic compounds free of fractures in sizes greater than the order of fifty grams, even with elaborate precautions with respect to purity of the material, temperature control and the like.

We have found that effective scintillation responses may be obtained with solutions of polynuclear aromatic hydrocarbons thereby eliminating all difficulties in providing scintillation elements of as large size as may be desired. While useful scintillation responses may be obtained with solutions of such polynuclear aromatic hydrocarbons as naphthalene and anthracene, particularly efficient responses are obtained with solutions of terphenyl (1,4-diphenylbenzene) in hydrocarbons such as m-xylene, benzene and toluene. A solution of 0.5 gram terphenyl in 100 cc. of m-xylene gives a scintillation response efficiency of the order of 20 times that of m-xylene alone and of the same order as the response of naphthalene crystal. A substantial response is obtained with solutions containing as little as 3 parts of terphenyl in 100,000 parts of xylene.

The accompanying drawing is a diagrammatic representation of a scintillation counter assembly embodying the principles of the invention.

In the drawing, 10 is a suitable container, such as a "Pyrex" glass or quartz cell, containing a solution of a polynuclear aromatic hydrocarbon in a liquid hydrocarbon solvent. The dimensions of the container may be varied as desired. Cell lengths of from ¼ to 6 inches have been used. The light emitted from the solution in response to ionizing radiation diagrammatically indicated at A is received by photomultiplier tubes 11, selected from commercially available types for maximum sensitivity to light of the wave length emitted by the solution, for example, 1P21 photomultipliers. 12 is a fast amplifier, such as a model 501 amplifier, that amplifies the pulses generated in the phototubes and transmits them to a suitable indicating or recording device 13, such as a direct view oscilloscope, a scaler counter or a differential pulse height discriminator and scaler.

The arrangement of apparatus shown in the drawing is purely illustrative and the scintillation counter cell of the invention may be used in a wide variety of arrangements which will be apparent to those skilled in the art from the foregoing description.

We claim:
1. A method of detecting ionizing radiation which comprises passing the radiation into a solution of a polynuclear aromatic hydrocarbon in a hydrocarbon solvent.
2. A method of detecting ionizing radiation which comprises passing the radiation into a solution of para-terphenyl in a hydrocarbon solvent.
3. A method of detecting ionizing radiation which comprises passing the radiation into a solution of para-terphenyl in xylene.
4. A scintillation counter comprising in combination a solution of a polynuclear aromatic hydrocarbon in a hydrocarbon solvent, a photosensitive element positioned to receive light from the solution and means for detecting pulses generated in the photosensitive element.
5. A scintillation counter comprising in combination a solution of para-terphenyl in a hydrocarbon solvent, a photosensitive element positioned to receive light from the solution and means for detecting pulses generated in the photosensitive element.
6. A scintillation counter comprising in combination a solution of para-terphenyl in a liquid aromatic hydrocarbon, a photosensitive element positioned to receive light from the solution and means for detecting pulses generated in the photosensitive element.
7. A scintillation counter comprising in combination a solution of para-terphenyl in xylene, a photosensitive element positioned to receive light from the solution and means for detecting pulses generated in the photosensitive element.
8. A scintillation counter comprising in combination a solution of para-terphenyl in a hydrocarbon solvent, a multiplier phototube positioned to receive light from the solution, a potential pulse indicator, and an amplifying circuit connecting the phototube and the indicator.

References Cited in the file of this patent

UNITED STATES PATENTS

| | | |
|---|---|---|
| 2,459,512 | Fash et al. | Jan. 18, 1949 |
| 2,549,574 | Condiff | Apr. 17, 1951 |
| 2,550,106 | Coltman et al. | Apr. 24, 1951 |

OTHER REFERENCES

The Scintillation Counters, Coltman; reprinted from the Proceedings of the I. R. E., vol. 37, No. 6, June 1949, pp. 671–682.

"Monsanto Chemicals and Plastics," 27th ed., pp. 173, 174, Monsanto Chemical Co.

Fluorescent Liquids for Scintillation Counters, by Hartmut Kallmann and Milton Furst; Nucleonics, vol. 8, No. 3, March 1951, pages 32 to 39.

Scintillation Counting with Solutions, by Hartmut Kallmann, from The Physical Review, vol. 78, 1950.